(12) United States Patent
Jones

(10) Patent No.: US 7,801,141 B2
(45) Date of Patent: Sep. 21, 2010

(54) TRUE RING NETWORKS WITH GATEWAY CONNECTIONS USING MAC SOURCE ADDRESS FILTERING

(75) Inventor: Michael Jones, Newport (GB)

(73) Assignee: Micrel, Inc., San Jose, CA (US)

( * ) Notice: Subject to any disclaimer, the term of this patent is extended or adjusted under 35 U.S.C. 154(b) by 76 days.

(21) Appl. No.: 12/180,174

(22) Filed: Jul. 25, 2008

(65) Prior Publication Data

US 2010/0020798 A1    Jan. 28, 2010

(51) Int. Cl.
H04L 12/28 (2006.01)
H04L 12/56 (2006.01)

(52) U.S. Cl. .................................................. 370/392

(58) Field of Classification Search ............... 370/370, 370/389, 392, 352, 400, 401, 395, 225, 219, 370/222, 390, 412; 709/221, 222, 223, 246, 709/218; 710/110
See application file for complete search history.

(56) References Cited

U.S. PATENT DOCUMENTS

| | | | | |
|---|---|---|---|---|
| 5,414,704 A * | 5/1995 | Spinney | | 370/389 |
| 5,535,338 A * | 7/1996 | Krause et al. | | 709/222 |
| 5,544,319 A * | 8/1996 | Acton et al. | | 709/246 |
| 5,590,285 A * | 12/1996 | Krause et al. | | 709/218 |
| 6,026,088 A * | 2/2000 | Rostoker et al. | | 370/395.53 |
| 6,334,148 B1 * | 12/2001 | Sandstrom et al. | | 709/219 |
| 6,591,322 B1 * | 7/2003 | Ervin et al. | | 710/110 |
| 6,731,625 B1 * | 5/2004 | Eastep et al. | | 370/352 |
| 6,952,421 B1 * | 10/2005 | Slater | | 370/401 |
| 2001/0048687 A1 | 12/2001 | Coden | | |
| 2005/0063396 A1 * | 3/2005 | Yu | | 370/401 |
| 2005/0089054 A1 * | 4/2005 | Ciancaglini et al. | | 370/412 |
| 2005/0243823 A1 | 11/2005 | Griswold et al. | | |
| 2006/0098571 A1 * | 5/2006 | Takefman | | 370/222 |
| 2007/0116014 A1 | 5/2007 | Shuen et al. | | |
| 2007/0171917 A1 * | 7/2007 | Dai | | 370/395.53 |
| 2008/0080498 A1 | 4/2008 | Yoon | | |
| 2008/0095047 A1 * | 4/2008 | Skalecki et al. | | 370/225 |
| 2008/0175239 A1 * | 7/2008 | Sistanizadeh et al. | | 370/390 |
| 2009/0073988 A1 * | 3/2009 | Ghodrat et al. | | 370/395.53 |
| 2009/0274044 A1 * | 11/2009 | Goose et al. | | 370/225 |

\* cited by examiner

Primary Examiner—Pankaj Kumar
Assistant Examiner—Prenell P Jones
(74) Attorney, Agent, or Firm—Patent Law Group LLP; Carmen C. Cook

(57) ABSTRACT

A method in a network device implements source address filtering, including gateway address filtering, to enable network devices to be configured in a true Ethernet ring network. By implementing source address filtering or source address filtering with gateway address filtering, a true ring network can be formed using Ethernet protocols where all the links between the network devices in the ring are active paths while avoiding data packets being switched endlessly around the ring. In one embodiment, a data packet in the true ring network is terminated when the source address of the data packet matches the local address of the network device. In another embodiment, a data packet in the true ring network is terminated when the source address of the data packet matches the address of the gateway switch connected to the network device.

8 Claims, 9 Drawing Sheets

US 7,801,141 B2

TRUE RING NETWORKS WITH GATEWAY CONNECTIONS USING MAC SOURCE ADDRESS FILTERING

CROSS-REFERENCE TO RELATED APPLICATION

This application is related to U.S. patent application Ser. No. 12/180,188, entitled "True Ring Networks Using Tag VLAN Filtering," filed concurrently herewith, by Michael Jones et al., which patent application is incorporated herein by reference in its entirety.

FIELD OF THE INVENTION

The invention relates to a data communication device and method and, in particular, to a data communication device and method which enables the implementation of a true Ethernet ring network.

DESCRIPTION OF THE RELATED ART

Data communication networks, such as local area networks (LANs), are used in interconnecting network devices to facilitate data communication between two or more network devices. "Ethernet" data networks refer to data networks implementing the class of Carrier Sense Multiple Access/Collision Detection (CSMA/CD) protocols described by IEEE standard 802.3. IEEE standard 802.3 defines a number of wiring and signaling standards for the physical layer, means of network access at the Media Access Control (MAC)/Data Link Layer, and a common addressing format for Ethernet data networks. The Ethernet standard includes, among other things, the 10Base-T Ethernet which is the original Ethernet and transmits at a rate of 10 Mbit per second, the 100Base-TX Ethernet which is referred to as the Fast Ethernet and carries traffic at the nominal rate of 100 Mbit per second and the Gigabit Ethernet which transmits at a rate of 1 gigabits per second. IEEE standard 802.3 also specifies the maximum cable length for a network segment. For instance, each network segment in a 100Base-TX Ethernet can have a maximum distance of 100 meters (330 ft) only.

Ethernet networks are typically implemented using a star topology or a tree topology. The nature of the Ethernet data transmission protocol prevents a ring or a loop to be formed in an Ethernet data network. In fact, a true ring configuration is strictly forbidden in Ethernet because certain data packets in an Ethernet ring network may be duplicated and forwarded around the ring indefinitely, quickly degrading the bandwidth and efficiency of the network. In particular, Ethernet data packets that are broadcast data packets, multicast data packets and unicast data packets with incorrect destination addresses will be susceptible to being switched in an endless loop around a true ring network. Therefore, Ethernet networks are typically configured using the star or tree topology. Alternately, Ethernet networks have been known to be configured in a ring but with a disabled link so as to break the complete loop.

For instance, a common configuration for an Ethernet data network is a daisy chain environment where multiple network devices are interconnected serially to enable data communications to flow between the start node (network device A) and the end node (network device G), as shown in FIG. 1. In the present illustration, the network devices are 3-port switches 2 interconnected by cable segments 3. The daisy chain Ethernet environment 1 is commonly used in an assembly line where the network devices form multiple drops along the network to equipments 4 for providing control signals to or collecting data from the assembly line equipments.

One drawback of the daisy chain or star topology for Ethernet is the lack of redundancy. In a daisy chain Ethernet, if one network device fails, then all network devices downstream from the failed device will lose connectivity to the upstream device. A known solution to implement redundancy in a daisy chain Ethernet data network is to add a cable 5 between the end node (switch G) and the start node (switch A) to create a loop and implement redundancy by managing blocked link 5. IEEE 802.1d Spanning Tree Protocol (STP) or other schemes are commonly used to provide a means of identifying loops in an Ethernet network and breaking the loop and managing the redundant link. The virtual break is typically realized by disabling a port on one of the network devices to block the link from transmitting data. For example, cable 5 between switch A and switch G is blocked and the connection is virtually open even though the two switches are physically connected by cable 5. When the network is thus configured, if any one network device fails, STP will select the alternate path to re-establish communications with the remaining downstream devices. A daisy chain Ethernet network with redundancy is thus not a true ring network as the loop is broken and the active paths do not form a complete loop. The blocked link in the loop is used as a back-up data link and is activated only in the event of a failure in another link.

However, a ring network topology is particularly desirable in many applications, such as Industrial Control and Automotive. The benefits of a 'ring' topology over the 'star' topology is that the ring topology simplifies cabling and can extend Ethernet's reach without going to the expense of a fibre-based system. For example, in the case of a surveillance system distributed around a building perimeter or a factory production line, by linking each camera or sensor up in a ring configuration will prevent the need for a series of longer cable runs each routed back to a central switch, no more than the maximum distance allowed by the IEEE 802.3 standard. Reduction in the required cabling of an Ethernet ring network also provides benefits welcome to the automotive and aerospace industry. Less cabling means weight reductions which has a direct impact on fuel efficiency and hence, overall costs of the system. Accordingly, a method to implement an Ethernet network using a true ring topology is desired.

SUMMARY OF THE INVENTION

According to one embodiment of the present invention, a method in a network device configured in a true ring network with other network devices where the network device has a first port and a second port connected to the true ring network and a third port connected to a processor, the method including: connecting the network device to transmit data packets in a single direction around the true ring network where the first port is an ingress port and the second port is an egress port; enabling ingress source address filtering on the first port and the second port and not the third port; receiving a data packet at the first port of the network device; determining if the source address of the data packet matches the local address of the network device; when the source address of the data packet matches the local address of the network device, terminating the data packet; when the source address of the data packet does not match the local address of the network device, determining if the destination address of the data packet matches the local address of the network device; when the destination address of the data packet matches the local address of the network device, transferring the data packet to the third port; and when the data packet is a multicast data packet for a multicast group in which the network device belongs or a broadcast data packet, transmitting the data packet to the third port and through the egress port.

According to another aspect of the present invention, a method in a network device configured in a true ring network where the network device has a first port and a second port connected to the true ring network and a third port connected to a processor and the network device has a local address and a local VID tag (VLAN identifier tag), the method including: connecting the network device to transmit data packets in a single direction around the true ring network where the first port is an ingress port and the second port is an egress port; enabling ingress tag VLAN filtering on the ingress port only; configuring a VLAN table in the network device to terminate an incoming data packet when a VID tag (VLAN identifier tag) of the incoming data packet matches the local VID tag of the network device; and configuring the VLAN table in the network device to accept the incoming data packet when the VID tag of the incoming data packet does not match the local VID tag of the network device.

The present invention is better understood upon consideration of the detailed description below and the accompanying drawings.

BRIEF DESCRIPTION OF THE DRAWINGS

FIG. 9, including

DETAILED DESCRIPTION OF THE PREFERRED EMBODIMENTS

In accordance with the principles of the present invention, a data communication device and method implements source address filtering, including gateway address filtering, to enable network devices to be configured in a true Ethernet ring network. In another embodiment, a data communication device and method implements tag VLAN filtering to enable network devices to be configured in a true Ethernet ring network where data traffic flows in a single direction around the ring. By implementing the source address filtering or tag VLAN filtering data communication method of the present invention, a true ring network can be formed using Ethernet protocols where all the links between the network devices in the ring are active paths while avoiding data packets being switched endlessly around the ring. A true ring Ethernet network has many advantages in industrial control, automotive and aerospace application to allow network devices to be connected in a ring to simplify network configuration and reduce cable length and weight of the overall system.

Figure 1:
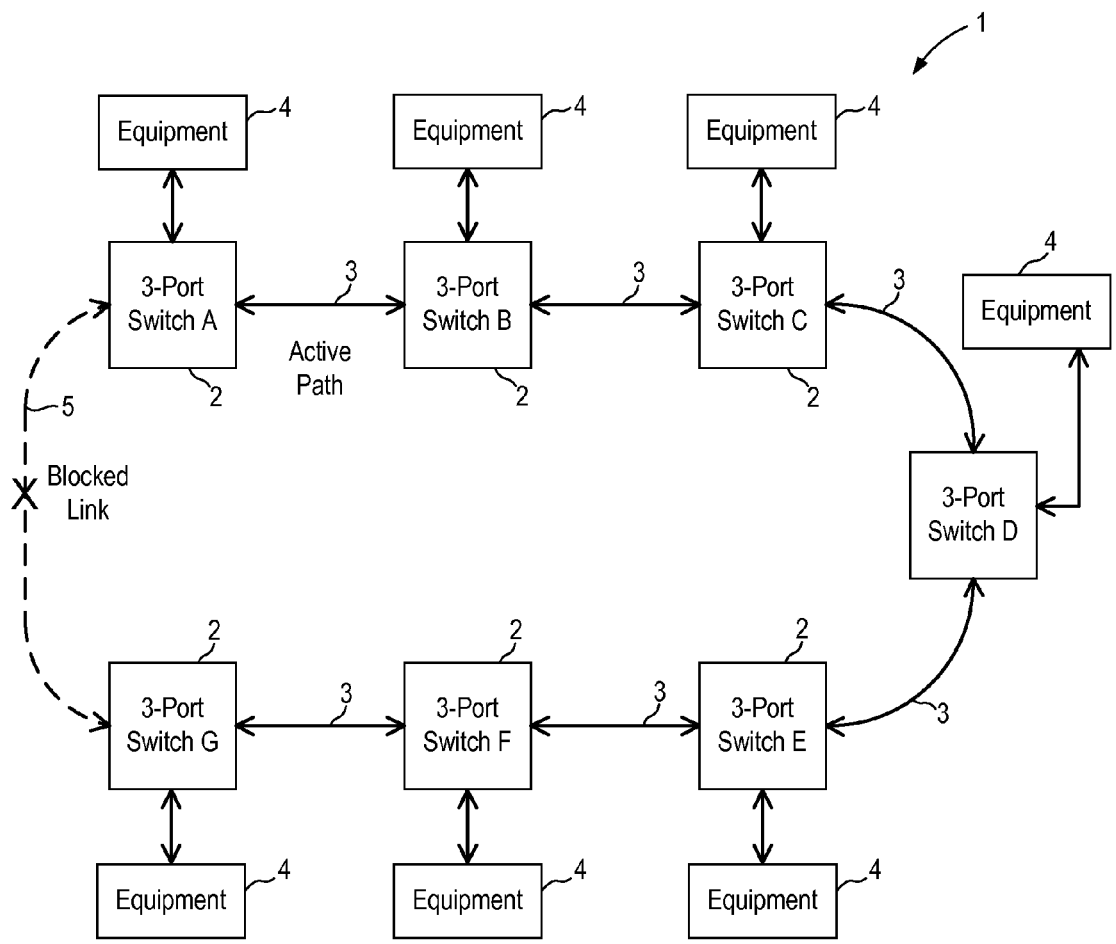
FIG. 1 illustrates a conventional daisy chain Ethernet environment where a number of network devices are daisy-chained together to enable data communications to flow between the start node (network device A) and the end node (network device G).
Figures 2A, 2B, 3:
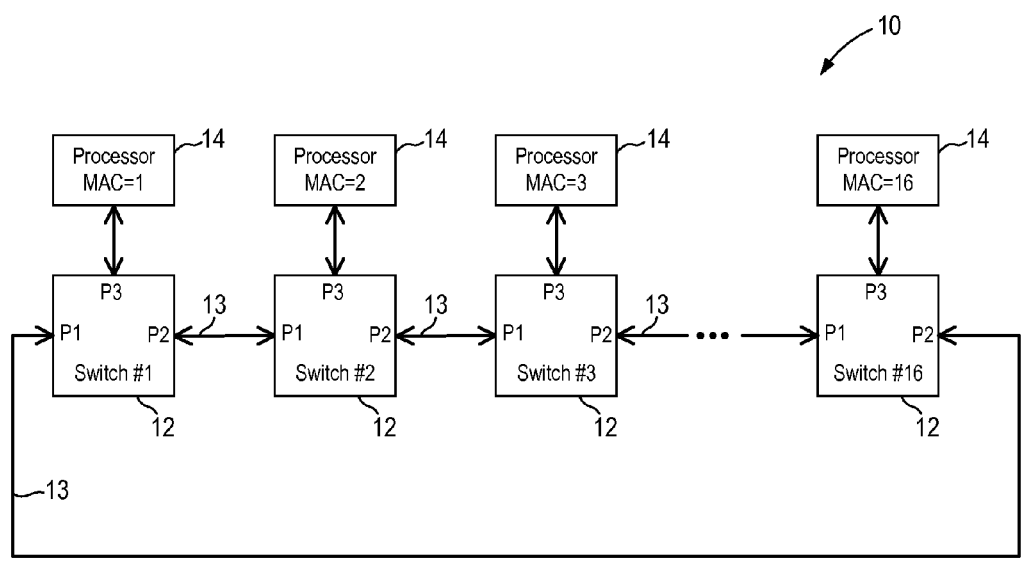
FIG. 2a illustrates an Ethernet data frame format under IEEE standard 802.3.
FIG. 2b illustrates an Ethernet VLAN data frame format under IEEE standard 802.1Q.
FIG. 3 is an Ethernet data network configured in a true ring configuration and implementing the source address filtering method according to one embodiment of the present invention.

In the present description, an "Ethernet" data network refers to a data network implementing the class of Carrier Sense Multiple Access/Collision Detection (CSMA/CD) protocols covered by IEEE standard 802.3. Furthermore, in the present description, VLAN refers to a virtual local area network implemented in accordance with IEEE standard 802.1Q. FIG. 2a illustrates an Ethernet data frame format under IEEE standard 802.3. A basic Ethernet data frame includes a preamble, a start-of-frame delimiter (SFD), a destination address (DA) field, a source address (SA) field, a length or type field, a data field and a frame check sequence (FCS) for forward error correction. FIG. 2b illustrates an Ethernet VLAN data frame format under IEEE standard 802.1Q. The VLAN Ethernet data frame is the same as the basic Ethernet data frame except with the addition of the VLAN protocol ID field, and the VLAN identifier (VID) field for identifying the VLAN from which the data frame originates.

In the present description, a source address and a destination address include but are not limited to the Media Access Control (MAC) addresses programmed into a network device. Alternately, the source address and destination address can refer to other addresses or signals for identifying the originating device from which the data frame is send and the network device to which the data frame is targeted. For instance, Internet Protocol (IP) addresses or port number information in the Universal Datagram Protocol (UDP) header can be used for the source and destination addresses.

The data communication method of the present invention is implemented in network devices interconnected by network cables (such as Category 5 or Category 6 cables) to form a local area network. In the present description, "network devices" refer to data network infrastructure elements, such as switches, hubs, gateways, bridges or routers, that have multiple ports for interconnecting data links on a data network. In an IEEE 802 LAN (such as an Ethernet), the network devices are usually layer 2 devices such as layer 2 switches and transparent multi-port bridges. In an IEEE802 LAN, layer 2 is the data link layer and thus a layer 2 device can also be referred to as a data link layer device. Bridges are multi-port devices that allow simultaneous communication between nodes coupled to the ports of the bridge. A switch has multiple paths between each input-output port pair.

True Ring Ethernet Using Source Address Filtering

FIG. 3 is an Ethernet data network configured in a true ring configuration and implementing the source address filtering method according to one embodiment of the present invention. Referring to FIG. 3, an Ethernet network 10 is formed by multiple network devices 12 connected in a loop by cable segments 13. Each network device 12 is coupled to a processor 14 to which data frames received from the ring network is to be sent and from which data frames to be transmitted to the ring network is generated. Ethernet network 10 is a true ring network in that all links between the network devices 12 are active data paths and there is no back up data link that is blocked or disabled. This is in contrary to the conventional Ethernet ring network where the network devices are physically connected in a ring but at least one of the link is blocked or disabled to prevent a true ring network from being formed around the loop.

In the present embodiment, network devices 12 are implemented as 3-port switches. To form the true ring network, port number 2 (P2) of each network device is connected to port number 1 (P1) of the adjacent network device. Port number 3 (P3) is coupled to a processor 14. Each processor has associated therewith a unique MAC address number (MAC=1 to MAC=16).

To prevent data packets from being switched in an endless loop around the ring network, network devices 12 implement the source address filtering method of the present invention where a data packet is dropped by the network device when the source address of the data packet matches the local MAC address. In this manner, any data packets will only travel around the ring once and then the data packet will be dropped when it arrives back at the originating network device.

The source address filtering method of the present invention is implemented in network devices 12 using a set of specific configurations. First, MAC address learning on ports that are connected to the ring is disabled. In normal Ethernet network operations, a network device learns the MAC addresses of incoming data packets and associate the MAC addresses with the respective port numbers. The learned information is stored in a forwarding address table to be used for forwarding future data packets. When a data packet arrives with a certain MAC address as the destination address, the network device looks up the forwarding address table and when an entry is found, the associated port number is retrieved and the data packet is transmitted onto that port. To implement that source address filtering method of the present invention, such MAC address/port number learning is disabled on all the ports connected to the ring. In the present embodiment, address/port learning is disabled on both port 1 and port 2 as these are the ports connected to the ring (the "ring ports").

Second, ingress source address filtering should be enabled at all the ports connected to the ring but ingress source address filtering should be disabled at all ports not connected to the ring. That is, ports 1 and 2 of each switch 12 should have ingress source address filtering enabled while port 3 (connected to the processor) should not have any source address filtering enabled.

Third, processor 14 at each network device is configured to transmit data traffic onto the ring in a single direction only. The single direction data flow can be realized by physically connecting the ring network in a single direction or by configuring the routing path within switches 12. In a single direction transmission, switch 12 sends out data packets on either port 1 (P1) for counter-clockwise direction or port 2 (P2) for clockwise direction. Broadcast or multicast data packets will not be transmitted to both ports but rather will only be sent to the selected port for travel around the ring network. Nevertheless, the ring network can be physically configured as a bidirectionally network with the connection in one direction being used as the active paths and the connection in the other direction being used for redundancy.

Figure 4:
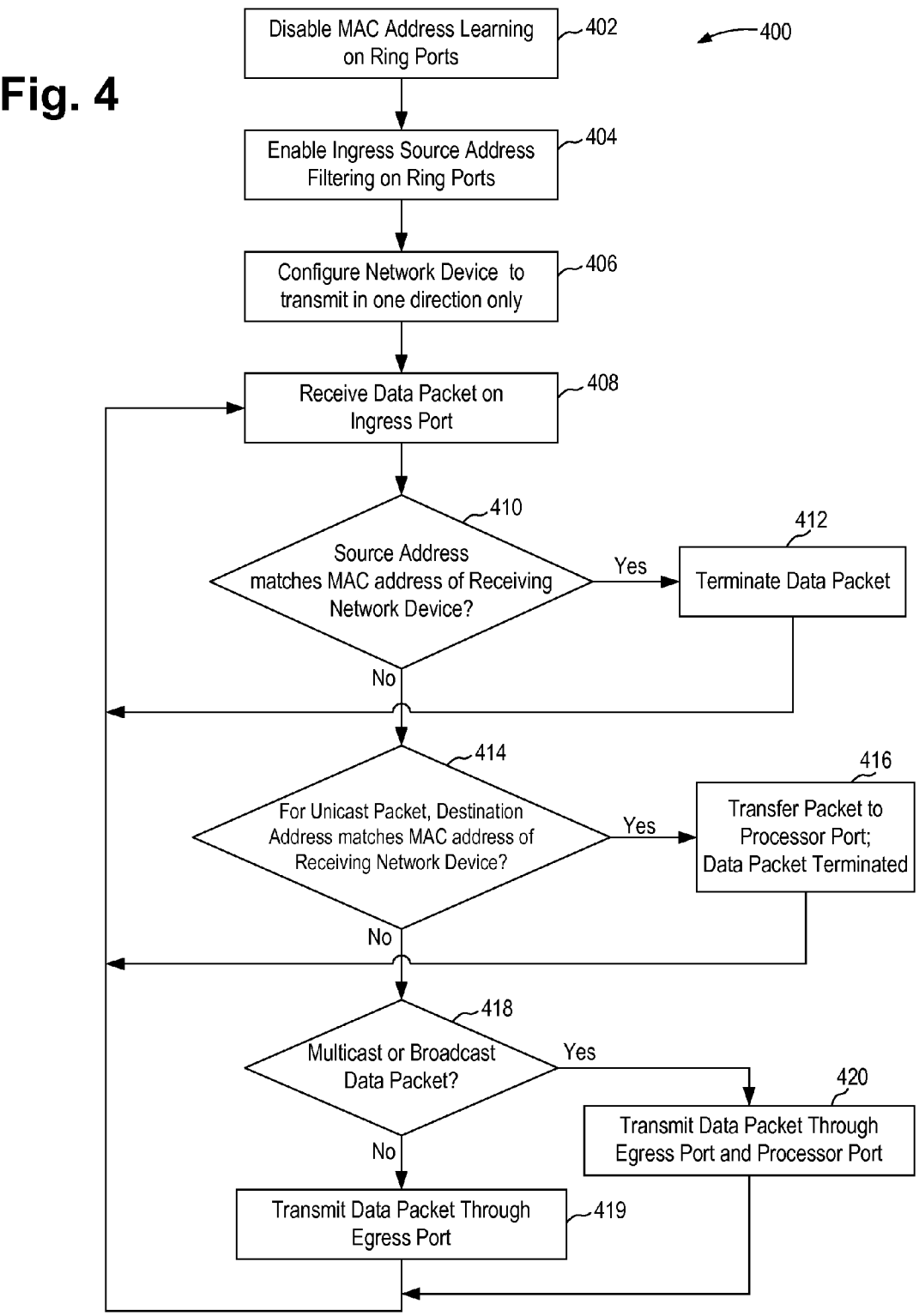
FIG. 4 is a flow chart illustrating the operation of the source address filtering method according to one embodiment of the present invention.

FIG. 4 is a flow chart illustrating the operation of the source address filtering method according to one embodiment of the present invention. The operation of the source address filtering method of the present invention will be explained with reference to FIG. 4 and by way of an example of a broadcast data packet being sent onto the ring from Switch #2 in network 10. In the present embodiment, source address filtering method 400 starts by disabling, at each network device, MAC address learning on all ports connected to the ring (step 402). In the present example, ports 1 and 2 (P1 and P2) of switches 12 have their MAC address learning disabled. Then, method 400 proceeds to enable ingress source address filtering on the ring ports P1 and P2 (step 404). Also, method 400 configures the switches so that the data packets are transmitted in one direction only, such as only out of port P2 or port P1 only but not broadcast to both (step 406).

When Switch #2 (with an MAC address of 2) sends a broadcast data packet onto the ring through port 2 (P2), the broadcast data packet will have a MAC Source Address='2' and a MAC Destination Address='all ones'. The broadcast data packet will continue around the ring as each subsequent switch will forward it to all ports, except the ingress port. For instance, at Switch #3, the broadcast data packet is received on ingress port P1 (step 408). Switch #3, implementing method 400, determines if the source address of the incoming data packet matches its own MAC address (step 410). In this case, the source address of "2" does not match the MAC address of "3" for Switch #3 and Switch #3 proceeds to step 414 to determine if the incoming data packet is a unicast data packet where the destination address matches its own MAC address. If the data packet is a unicast data packet having a destination address that matches the local MAC address, the data packet will be forward to port 3 to the processor of Switch #3 (step 412) and the unicast data packet with a correct destination address is terminated.

In the present illustration, the data packet is not a unicast data packet. Method 400 proceeds to determine that the incoming data packet is a broadcast or multicast data packet (step 418). If the data packet is not a broadcast or multicast data packet, then the data packet will be transmitted through the egress port (P2) to reach other network devices in the ring network (step 419). For a broadcast data packet, Switch #3 will automatically transfer the broadcast data packet to all ports except the ingress port (P1). Thus, the broadcast data packet will be transferred to port P3 (to processor 14) and to the egress port P2 (step 420). In the case of a multicast data packet, Switch #3 will forward the data packet to the ports belonging to the members of the multicast group (step 420). Method 400 returns to step 408 to wait for the arrival of the next data packet.

The broadcast data packet will travel around the loop in network 10 until the data packet arrives back at the originating network device Switch #2 at port 1. Switch #2, implementing method 400, determines that the ingress broadcast data packet has a source address "2" that matches the local MAC address of "2" (step 410). The broadcast data packet will therefore be dropped (step 412) and Switch #2 returns to step 408 for receiving another data packet. As a result of the operation of method 400, the broadcast data packet has been routed to every switch in the network once as required, but dropped when returned to the originating network device to prevent the packet from continuing to be transmitted in an endless loop. The same operation applies to both multicast and unicast data packets. In the case of the multi-cast data packet, the data packet is transferred only to the processor of the network devices belonging to the multicast group. In the case of the unicast data packet, the data packet is transferred only to the processor having a MAC address matching the destination address of the unicast data packet.

Figure 5:
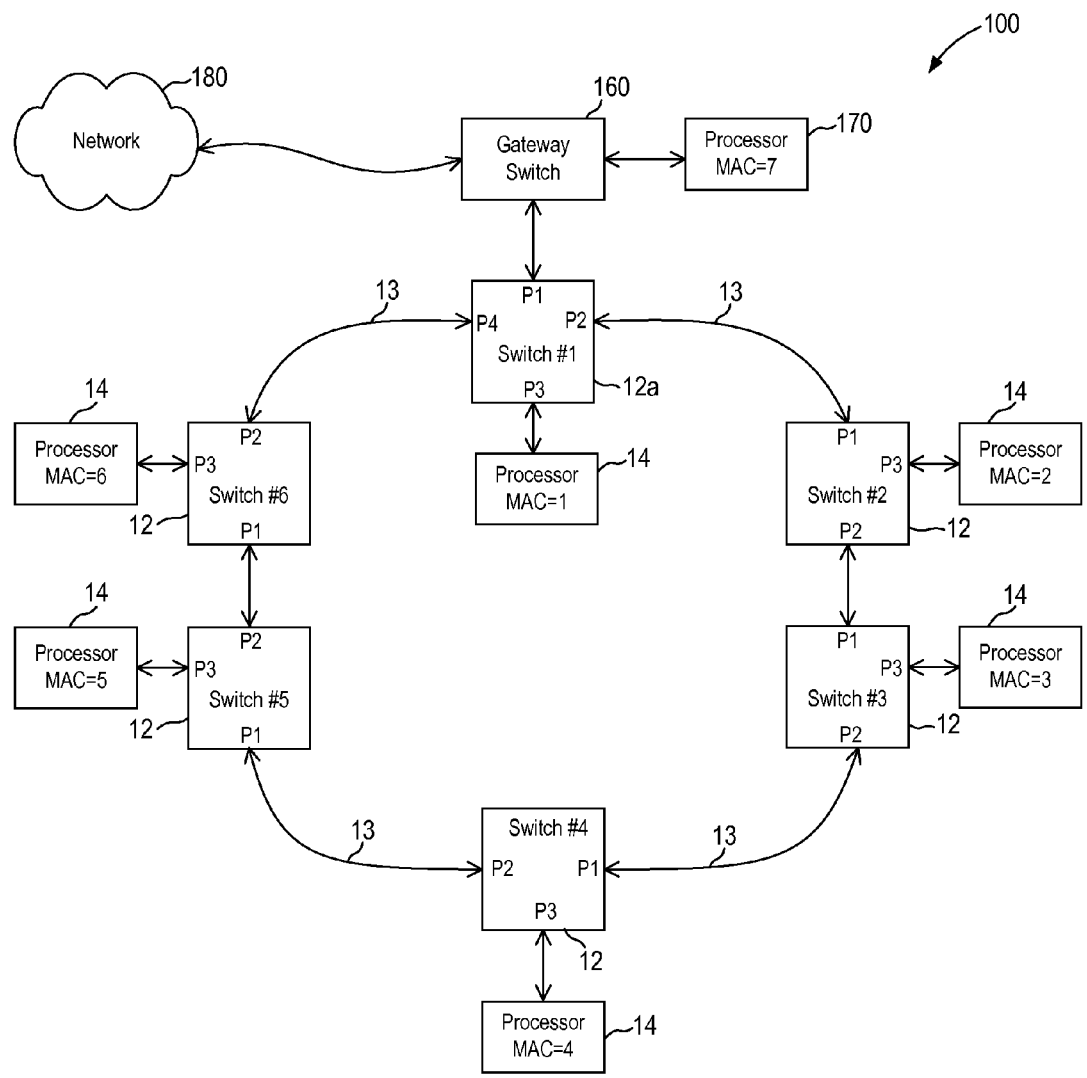
FIG. 5 is an Ethernet data network configured in a true ring configuration with a point-to-point connection with a gateway switch and implementing the source address filtering method according to a second embodiment of the present invention.

FIG. 5 is an Ethernet data network configured in a true ring configuration with a point-to-point connection with a gateway switch and implementing the source address filtering method according to a second embodiment of the present invention. Referring to FIG. 5, Ethernet data network 100 is formed by multiple network devices 12 connected in a loop by cable segments 13. Each network device 12 is coupled to a processor 14 to which data frames received from the ring network is to be sent and from which data frames to be transmitted to the ring network is generated. Ethernet network 10 is a true ring network in that all links between the network devices 12 are active data paths and there is no back up data link that is blocked or disabled.

In the present embodiment, network devices 12, except network device 12a, are implemented as 3-port switches. To form the true ring network, port 2 (P2) of each network device is connected to port 1 (P1) of the adjacent network device. Port 3 (P3) is coupled to a processor 14 for generating or receiving the data packets traveling on the ring network. Each processor has a unique MAC address number (MAC=1 to MAC=6). Network device 12a (Switch #1) is connected to a gateway switch 160 which is coupled to a data network 180. Gateway switch 160 thus forms a point-to-point connection with the Ethernet ring network 100 to facilitate data exchange between data network 180 and the ring network. Gateway switch 160 is coupled to a processor 170 with a MAC address of "7". Switch #1 interfacing with the gateway switch is a four-port switch with port 1 (P1) connected to the gateway switch 160, ports 2 (P2) and 4 (P4) being the ring ports connected to the ring network and port 3 (P3) connected to the processor 14 (with a MAC address of "1").

In the present embodiment, the Ethernet data network 100 is configured in a true ring and star configuration. Data packets arriving from network 180 through gateway switch 160 will include not just the local MAC source address of Switch #1 but also the MAC source address of the gateway switch 160. Thus, the data packets will contain a MAC source address that does not belong to any devices in the ring network. According to the second embodiment of the present invention, the network devices 12 and 12a implement the source address filtering method of the present invention including gateway address filtering whereby the source address of devices in the ring network as well as the source address of the gateway switch are both being filtered to terminate data packets that have traveled around the loop.

In Ethernet 100, processor 14 at each network device is configured to transmit data traffic onto the ring in a single direction only. The single direction data flow can be realized by physically connecting the ring network in a single direction or by configuring the routing path within switch 12a to transmit in a single direction only. In a single direction transmission, switch 12a sends out data packets on either port 4 (P4) for counter-clockwise direction or port 2 (P2) for clockwise direction.

Figure 6:
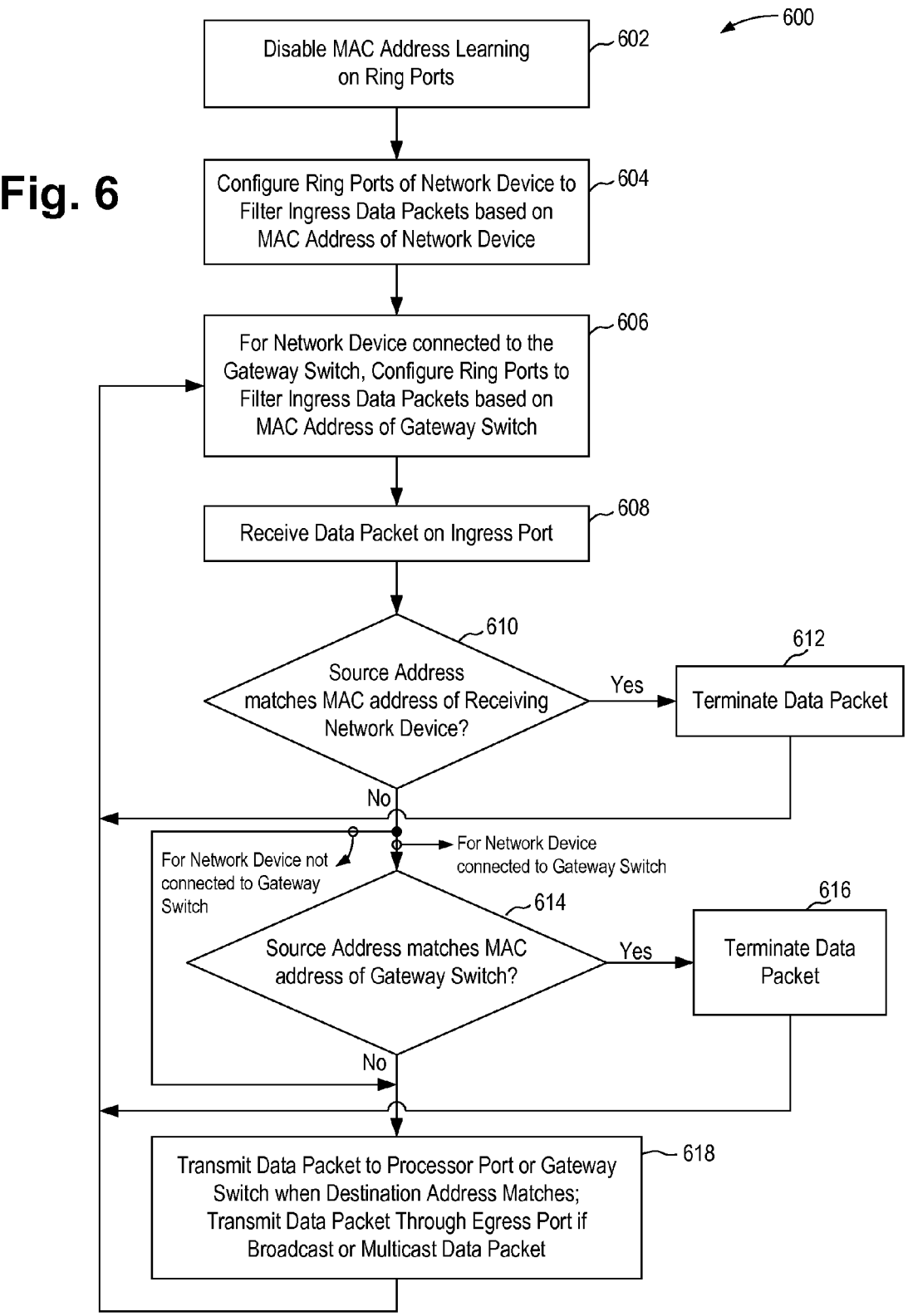
FIG. 6 is a flow chart illustrating the operation of the source address filtering method including gateway address filtering according to one embodiment of the present invention.

In Ethernet network 100, data packets originating from network devices 12 and 12a of the ring network will be handled in the same manner as the source address filtering method 400 of FIG. 4. For data packets originating from gateway switch 160 and being sent to the ring network through Switch #1, gateway address filtering is implemented in addition to source address filtering. FIG. 6 is a flow chart illustrating the operation of the source address filtering method including gateway address filtering according to one embodiment of the present invention. Method 600 starts by disabling MAC address learning on the ring ports of each network device (step 602). For switches 12, the ring ports are ports 1 and 2 (P1 and P2). For switch 12a, the ring ports are ports 2 and 4 (P2 and P4).

Then, ingress source address filtering based on the MAC address of the network devices is enabled on the ring ports (step 604). That is, for Switches #2 to #6, ports 1 and 2 (P1 and P2) have ingress source address filtering enabled in the same manner as method 400. For Switch #1 interfacing with the gateway switch, ports 2 and 4 (P2 and P4), connected to the ring network, are configured to filter and drop ingress packets generated locally once the packet completed the loop. That is, ports P2 and P4 of Switch #1 are configured to drop packets with a source MAC address of "1", being the MAC address of Switch #1.

Next, at the network device interfacing the gateway switch (Switch #1), ingress source address filtering based on the MAC address of the gateway switch is enabled on the ring ports of the interfacing network device (step 606). That is, for Switch #1, port 2 (P2) and port 4 (P4) are configured to filter and drop ingress packets generated by the gateway switch 160 once the packet completed the loop. That is, port 2 and port 4 of Switch #1 are configured to drop packets with a source MAC address of "7" being the MAC address of the gateway switch 160.

Note that there should be no source address filtering for the port of the interfacing network device (Switch #1) connected to the gateway switch. In the present illustration, there should be no source address filtering on port 1 (P1) of Switch #1 to allow all data packets to move freely between the gateway switch 160 and the ring network though Switch #1.

As thus configured, data packets originating from gateway switch 160 and sent to the ring network via Switch #1 will travel around the ring network once. When the data packet completes a full loop and returns back to Switch #1, the packet will be filtered and dropped by the action of gateway source address filtering. Local packets generated by network devices connected directly to the ring will travel around the ring and be filtered in the same manner as described in method 400.

For instance, at step 608, an incoming data packet is received on the ingress port. The network device 12 or 12a checks to determine if the source address of the incoming data packet matches the MAC address of the receiving network device (step 610). If a match is found, then the data packet is terminated (step 612). If the source address does not match the local MAC address, method 600 continues by checking at Switch#1 (the switch interfacing with the gateway switch) to see if the source address of the incoming data packet matches the MAC address of the gateway switch (step 614). In other network devices (Switch #2 to #6) not connected to the gateway switch, step 614 is skipped. If a match is found, then the data packet is also terminated (step 616). If there is no match, method 600 continues by transmitting the data packet to the processor port of the network device (12 or 12a) when the destination address matches that of the network device (step 618) or to the gateway switch when the destination address matches that of the gateway switch. Also, if the data packet is a broadcast or multicast packet, the data packet will be forwarded to the processor port (if the network device is part of the multicast group) and also transmitted through the egress port.

In one embodiment, data packets from gateway switch 160 may have multiple MAC addresses associated with the gateway switch. In that case, the ring ports (P2 and P4) of Switch

1 interfacing the gateway switch to the ring network are programmed to filter out the multiple source addresses belonging to the gateway.

Alternately, if the source address of the data packets entering the ring network via gateway switch 160 cannot be known, then the VLAN filtering method in accordance with another aspect of the present invention can be used to tag the data packets. The VLAN filtering method of the present invention will be described in more detail below.

In the illustration shown in FIG. 5, the ring network of Ethernet network 100 is connected to a single gateway switch 160. In other embodiments, the network devices, such as switches 12, forming the ring network may each be coupled to respective gateway switches. That is, each of the Switches #1 to #6 can have a gateway switch connected to it. In the general case, the source filtering method of the present invention implements gateway address filtering by configuring the network devices interfacing with a gateway switch in the same manner as Switch #1 in FIG. 5. As thus configured, data packets originating from any of the gateway switches via any of the switches will be filtered when the data packets return to the associated switch where the switch is programmed to filter out data packets having the associated gateway MAC source address. The source address filtering method of the present invention thus provides flexibility and is adaptable to a wide variety of network configurations.

Tag VLAN Filtering

A VLAN (virtual local area network) is a method of forming independent logical networks within a physical network. There are two main types of VLAN—port-based and tag-based. In a port-based VLAN, each switch port is manually configured to select which other local ports are members of its VLAN. Ingress data packets are only allowed to be forwarded to other port members of the VLAN. In tag-based VLAN, the data frame format under IEEE 802.1q and shown in FIG. 2b is used for the data packets. As shown in FIG. 2b, each data packet includes a VLAN identifier (VID) field identifying the VLAN to which the data packet belongs. Each network device has stored thereon a programmed VLAN table listing the port members for each valid VID.

According to another aspect of the present invention, a true Ethernet ring network is formed using tag-based ingress VLAN filtering to ensure that data packets do not circulate the ring network in an endless loop. In a true ring network managed by tag-based VLAN filtering, the data network is configured so that the data traffic travels in one direction only—either clockwise or counter-clockwise around the ring. Sending traffic in one direction only has the added benefit of reducing power consumption as the ingress port can disable the transmitter and the egress port can disable the receiver, where the transmitters and receivers of a network device typically consume a large portion of power.

Figure 7:
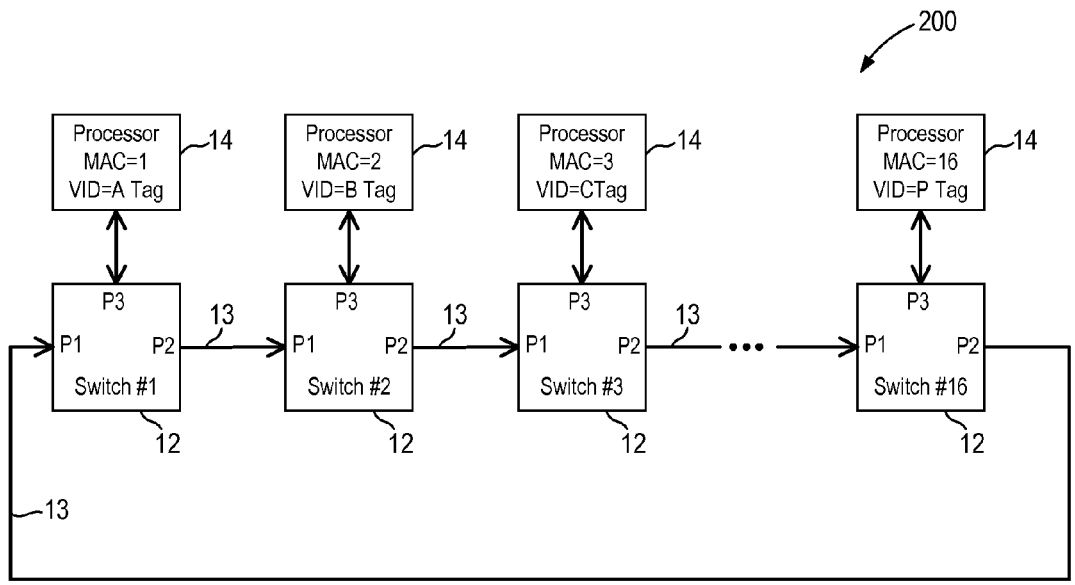
FIG. 7 is an Ethernet data network configured in a true ring configuration and implementing the tag VLAN filtering method according to one embodiment of the present invention.

FIG. 7 is an Ethernet data network configured in a true ring configuration and implementing the tag VLAN filtering method according to one embodiment of the present invention. Referring to FIG. 7, an Ethernet network 200 is formed by multiple network devices 12 connected in a loop by cable segments 13. Each network device 12 is coupled to a processor 14 to which data frames received from the ring network is to be sent and from which data frames to be transmitted to the ring network is generated. Ethernet network 200 is a true ring network in that all links between the network devices 12 are active data paths and there is no back up data link that is blocked or disabled.

In the present embodiment, network devices 12 are implemented as 3-port switches. To form the true ring network, port 2 (P2) of each network device is connected to port 1 (P1) of the adjacent network device. In the present illustration, Ethernet network 200 is configured to transfer data in a clockwise direction only. Therefore, port 1 (P1) of each switch is the ingress port receiving incoming data packets and port 2 (P2) of each switch is the egress port transmitting outgoing data packets. Port 3 (P3) is coupled to a processor 14 for generating or receiving the data packets for the ring network. Each processor has a unique MAC address number (MAC=1 to MAC=16) as well as a unique VID tag (VID=A to VID=P).

As described above, a true ring network is forbidden in Ethernet because certain data packets may end up being switched around the ring in an endless loop. In particular, data packets such as broadcast data packets, multicast data packets and unicast data packets with an incorrect destination MAC address will be susceptible to being switched in an endless loop around a true ring network. To prevent data packets from being switched in an endless loop around the ring network, network devices 12 implement the tag VLAN filtering method of the present invention where a data packet is dropped by the network device when the VID tag of the data packet matches the local VID tag. In this manner, any data packets will only travel around the ring once and then the data packet will be dropped when it arrives back at the originating network device.

Figure 9A:
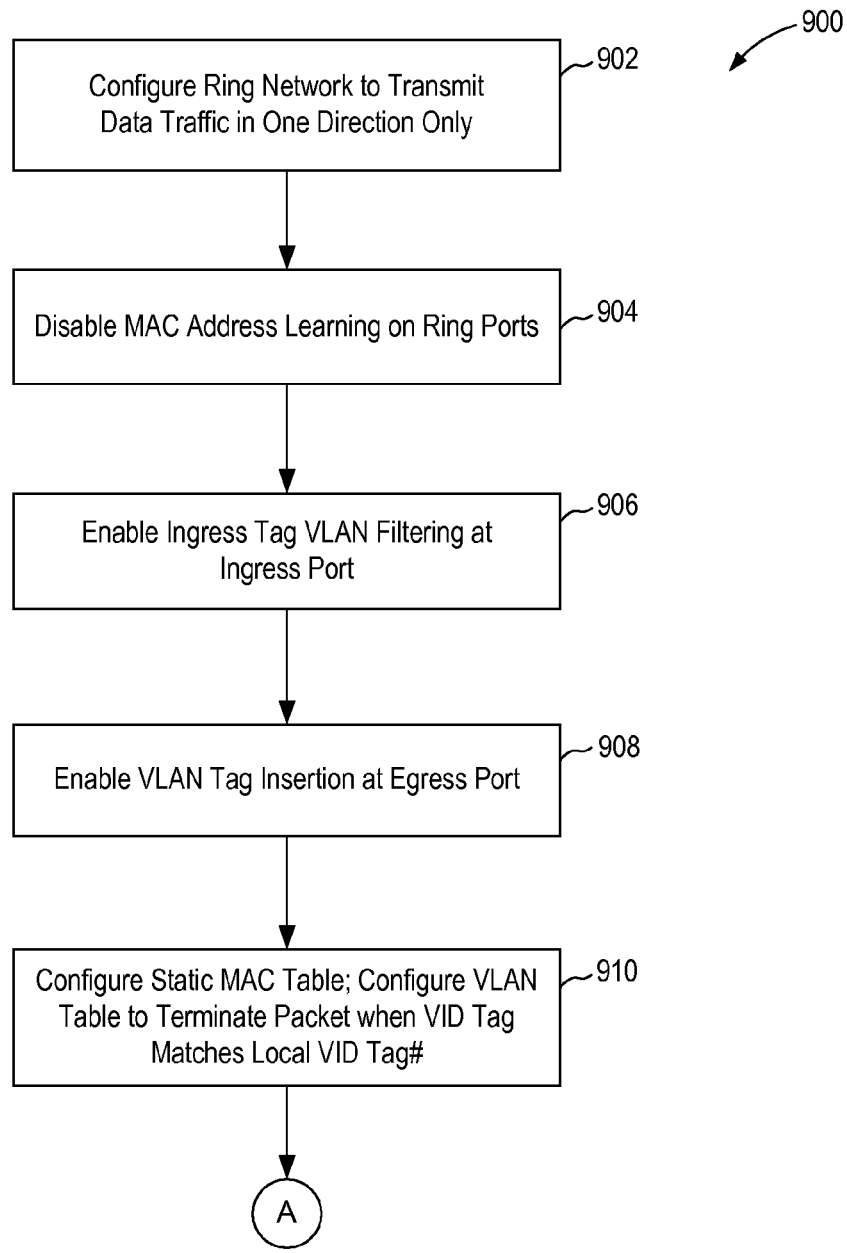
FIGS. 9A and 9B, is a flow chart illustrating the operation of the tag VLAN filtering method according to one embodiment of the present invention.
Figure 9B:
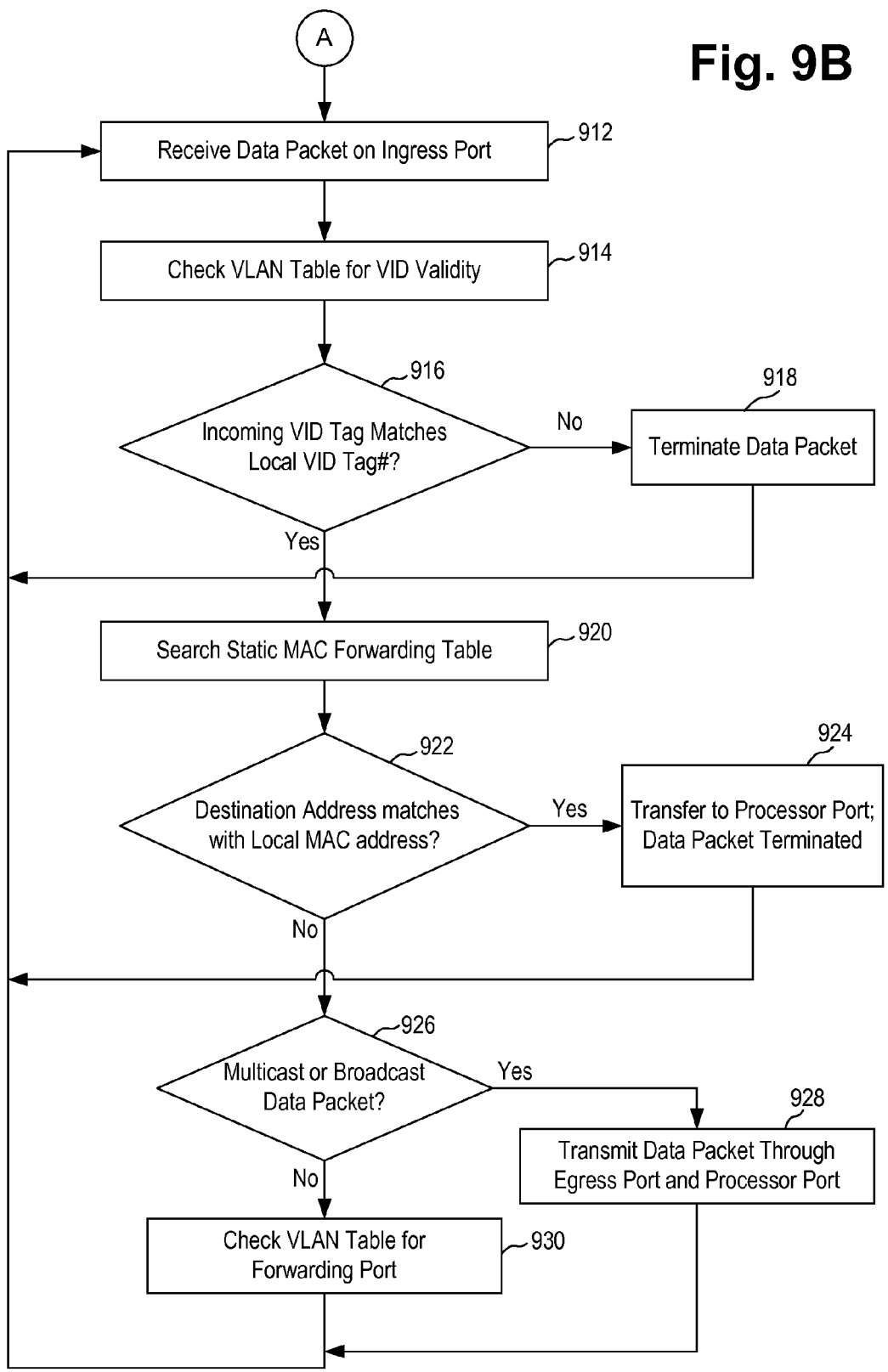

FIG. 9, including FIGS. 9A and 9B, is a flow chart illustrating the operation of the tag VLAN filtering method according to one embodiment of the present invention. The tag VLAN filtering method of the present invention is implemented at each network device 12 to enable network devices 12 to be formed in a true ring configuration. Method 900 starts by configuring the ring network to transmit data traffic in one direction only (step 902). Then, MAC address learning on ports that are connected to the ring is disabled (step 904). In the present embodiment, address/port learning is disabled on both port 1 and port 2 as these are the ports connected to the ring network (the "ring ports").

At step 906, ingress tag VLAN filtering is enabled at the ingress ports connected to the ring network. That is, port 1 only of each switch 12 has ingress tag VLAN filtering enabled.

At step 908, tag insertion is enabled at the egress ports connected to the ring network. That is, port 2 only of each switch 12 has tag insertion enabled where the VID tag associated with each switch is inserted into the egress data packets originating from that switch. Tag insertion is optional and is not needed if the processor associated with the switch generates data packets that already have the VID tag included.

Figure 8:
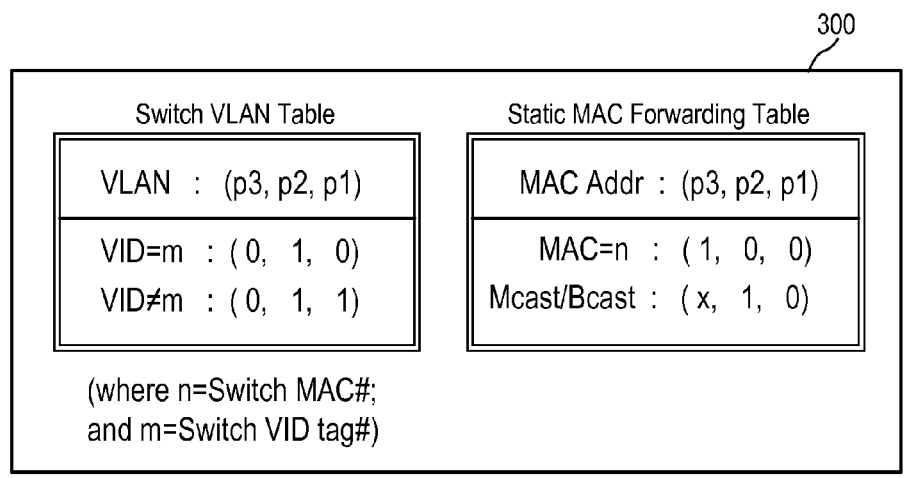
FIG. 8 illustrates the VLAN table and static MAC address table in a network device for implementing the tag VLAN filtering method according to one embodiment of the present invention.

At step 910, the static MAC forwarding table and the VLAN table are configured so that a data packet having a VID tag that matches the local VID# will be terminated. The specific table configuration for a 3-port switch is shown in FIG. 8. FIG. 8 illustrates the VLAN and static MAC forwarding tables in a network device implementing the tag VLAN filtering method according to one embodiment of the present invention. Referring to FIG. 8, in the static MAC forwarding table, when the MAC address of the incoming data packet matches the local switch's MAC address (MAC=n), then only port P3 is enabled and the data packet is transferred to the processor of the switch. For multicast or broadcast data packets, port P3 is optional (depending on multicast group membership) and port P2 is enabled to allow the data packets to be transferred to the egress port.

In the switch VLAN table, when the VID of the incoming data packet matches the 'local' switch VID tag (VID=m), the port member is only port P2 which is the egress port in the present embodiment. Thus, any ingress data packet received on port 1 and having a VID equal to the 'local' switch VID tag will be dropped as port 1 is not a member of the VLAN tag#. When the VID of the data packet does not match the 'local' switch VID (VID≠m), the port members are ports P1 and P2 which are the ingress and the egress ports, respectively, in the present embodiment. The data packet is thus allowed to be transmitted out of the egress port (P2).

In operation, data packets originating from a switch will be sent around the ring network until it reaches the intended node, designated by the data packet's destination MAC Address. At the destination network device, the data packet is removed from the ring network and sent to the processor of the network device via port 3. Broadcast packets, multicast packets or unicast packets with incorrect destination MAC addresses will be removed from the ring network by tag VLAN filtering when they complete a loop back to the originating network device. Ingress tag VLAN filtering will terminate any data packet whose VID Tag matches the local switch VID tag. More specifically, at a network device 12 (Switch #1 to Switch #16), an incoming data packet is received (step 912). The VID tag of the incoming data packet is checked for validity and ingress tag VLAN filtering is performed (step 914). If the VID of the incoming data packet is valid and matches the local VID tag# (step 916), the VLAN table indicates that port 1 (P1) is not a member of the VID tag#, the incoming data packet is then terminated (step 918) and method 900 returns to step 912. In this manner, ingress tag VLAN filtering is carried out.

When the VID of the incoming data packet is valid but does not match the local VID tag#, the port members are port 1 and port 2 (both the ingress and the egress ports) and method 900 proceeds to search the static MAC forwarding table for the forwarding port (step 920). If the destination address matches the local MAC address (MAC=n), then the data packet is transferred to the processor port and is terminated (step 924). If the data packet is a broadcast data packet (step 926), the data packet is transmitted to the egress port and the processor port (step 928). If the data packet is a multicast data packet (step 926), the data packet is transmitted to forwarding ports as determined by the static MAC forwarding table. For instance, the data packet is transferred to the processor port of the network device when the network device is a member of the multicast group. If the data packet is not a multicast or broadcast data packet, then the VLAN table is checked for the appropriate forwarding port (step 930). Method 900 returns to step 912 to wait for another incoming data packet.

The operation of the tag VLAN filtering method will be further described by ways of the following three examples. In the first example, it is assumed that Switch #1 sends a unicast packet with VID=A and an unknown destination address out on port 2. When the data packet is received by Switch #2 at ingress port 1, the VLAN table will be initially checked for valid VID. The VLAN table will indicate that VID=A is valid (VID≠m) with member ports 1 and 2 only. Next, the destination address is looked up in the static MAC forwarding table but the destination address is not found. Hence, the VLAN table is used to determine the forwarding port(s) which is port 2 in this case (since port 1 is the ingress port).

The data packet with the incorrect destination address will continue in the ring network to each switch where the same result will occur, until the data packet arrives back at Switch #1. Since Switch #1 port 1 has ingress tag VLAN filtering enabled and for the case of VID=m (VID=1), port members do not include the ingress port 1, the data packet is dropped. As a result, a unicast packet with an incorrect destination address will travel the loop once and then be terminated.

In another example, it is assumed that Switch #2 sends a unicast packet with VID=2 and DA=MAC16 ("DA" being destination address). When the data packet is received by Switch #3 port 1, the VLAN table will be initially checked for valid VID. The VLAN table will indicate that VID=2 is valid with member ports 1 and 2 only. Next, the destination address is looked up in the static MAC forwarding table but not found (MAC3≠MAC16). Hence, the VLAN table is used to determine the forwarding port(s) which is port 2 in this case. The packet will continue in the ring to each switch where the same result will occur, until it arrives at Switch #16. When the data packet is received by Switch #16 port 1, the VLAN table will be initially checked for valid VID. The VLAN table will indicate that VID=2 is valid. Next the destination address (MAC16) is looked up in the static MAC forwarding table. The forwarding port field for the case of MAC=16 is (1,0,0) so the packet is forwarded to port 3 (the processor port). The data packet is then removed from the ring network.

In a third example, it is assumed that Switch #3 sends a broadcast or multicast packet with VID=3. When the packet is received by Switch #4 port 1, the VLAN table will be initially checked for valid VID. The VLAN table will indicate that VID=3 is valid with member ports 1 and 2 only. Next the destination address is looked up in the static MAC forwarding table and is found. The forwarding port field will be either (1,1,0) or (0,1,0), depending upon whether or not the processor is a member of multicast group. In this case, the packet is always forwarded to port 2 but port 3 is optional depending on the broadcast or multicast status of the data packet. The data packet will continue in the ring to each switch where the same result will occur, until it arrives back at Switch #3. Since Switch #3 port 1 has ingress VLAN filtering enabled and VID=3 port members do not include port 1, the data packet is terminated.

In Ethernet ring network 200, redundancy can be provided by all switches sending traffic in the opposite direction if a fault is detected. As described above, sending traffic one way in the ring brings additional benefits of reduced power consumption and cost. Only the transmitter of the egress port and the receiver of the ingress port are actually required. Hence, the switch can disable the unused transmitter and receiver ports. This will have a significant impact on the power consumption of the circuit, as the physical layer transceiver (PHY) consumes the majority of the power for the switch.

Figure 10:
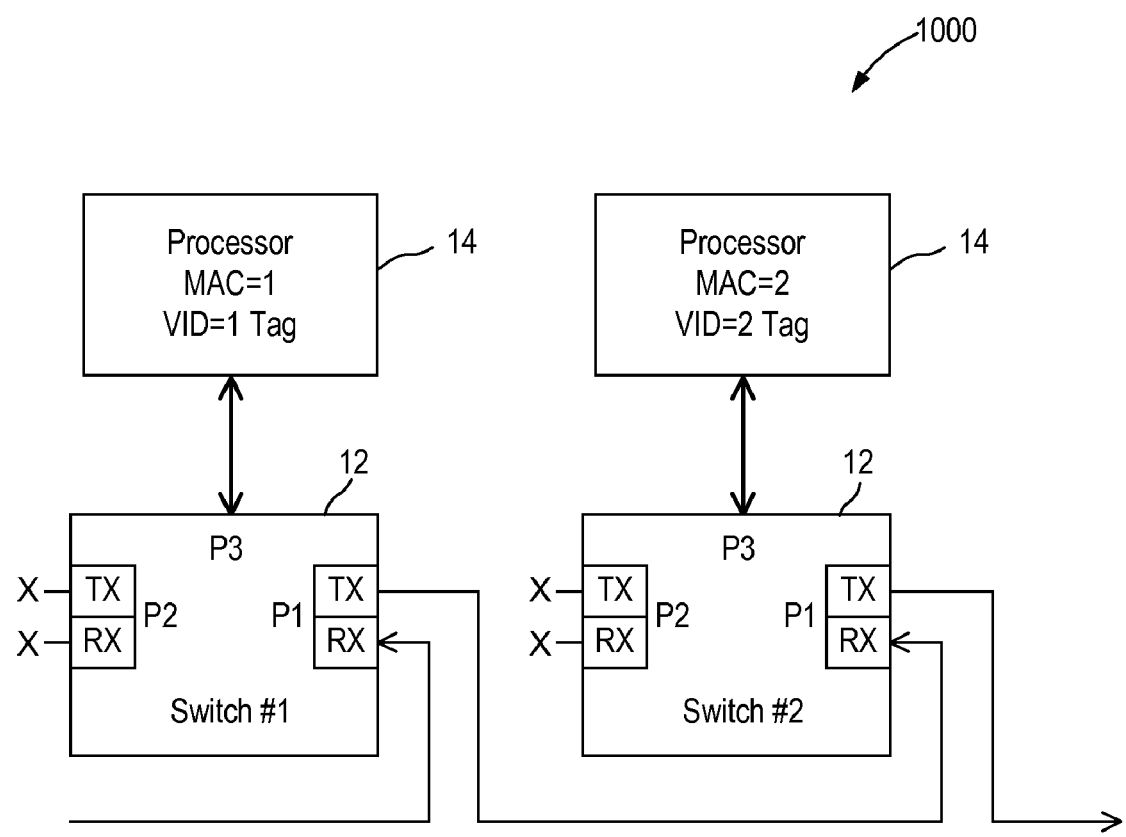
FIG. 10 illustrates the configuration of an Ethernet data network in a true ring configuration using tag VLAN filtering and port mirroring according to one embodiment of the present invention.

According to another aspect of the present invention, configuration of the true ring network in Ethernet can be further simplified with the use of Port Mirroring functionality. FIG. 10 illustrates the configuration of an Ethernet data network in a true ring configuration using tag VLAN filtering and port mirroring according to one embodiment of the present invention. In the Ethernet ring network 1000 of FIG. 10, only a single port (P1) is used to interface to the ring, leaving the other port (P2) powered down and available for redundancy. Port Mirroring allows any forwarding path(s) to be defined and 'mirrored' to a selected 'sniffer' port. In the present illustration, port 1 is used as the 'sniffer' port and is configured to mirror all packets that the switch receives at ingress port 1 and forwards to port 2 to egress port1. In this manner, a single port is used for both ingress and egress while preserving the tag VLAN filtering capability of the present invention.

The above detailed descriptions are provided to illustrate specific embodiments of the present invention and are not intended to be limiting. Numerous modifications and variations within the scope of the present invention are possible. The present invention is defined by the appended claims.

I claim:

1. A method in a network device configured in a true ring network with other network devices, the network device having a first port and a second port connected to the true ring network and a third port connected to a processor, the method comprising:

connecting the network device to transmit data packets in a single direction around the true ring network, the first port being an ingress port and the second port being an egress port;

enabling ingress source address filtering on the first port and the second port and not the third port;

receiving a data packet at the first port of the network device;

determining if the source address of the data packet matches a local address of the network device;

when the source address of the data packet matches the local address of the network device, terminating the data packet;

when the source address of the data packet does not match the local address of the network device, determining if the destination address of the data packet matches the local address of the network device;

when the destination address of the data packet matches the local address of the network device, transferring the data packet to the third port; and when the data packet is a multicast data packet for a multicast group in which the network device belongs or a broadcast data packet, transmitting the data packet to the third port and through the egress port, wherein the network device further includes a fourth port coupled to a gateway switch, the gateway switch being connected to a second network, the method further comprising:

enabling ingress gateway source address filtering on the first port and the second port and not the third port or the fourth port of the network device;

determining if the source address of the data packet matches the local address of the gateway switch;

when the source address of the data packet matches the local address of the gateway switch, terminating the data packet;

when the source address of the data packet does not match the local address of the gateway switch or the local address of the network device, determining if the destination address of the data packet matches the local address of the network device or the local address of the gateway switch;

when the destination address of the data packet matches the local address of the network device, transferring the data packet to the third port; and when the destination address of the data packet matches the local address of the gateway switch, transferring the data packet to the fourth port.

2. The method of claim 1, wherein the local address of the network device comprises a media access control (MAC) address of the network device and the source address of the data packet comprises a MAC address of the originating network device.

3. The method of claim 1, further comprising:
disabling address learning on the first port and the second port.

4. The method of claim 1, wherein the local address of the gateway switch comprises a MAC address of the gateway switch.

5. The method of claim 1, wherein the network device comprises one of switches, hubs, gateways, bridges or routers.

6. The method of claim 1, wherein the network device comprises a layer 2 device.

7. The method of claim 1, wherein the network device comprises a layer 2 device with three or more ports.

8. The method of claim 1, wherein the network device comprises a layer 2 device with four or more ports.

* * * * *